(12) United States Patent
Walker (10) Patent No.: US 9,132,399 B2
(45) Date of Patent: Sep. 15, 2015

(54) PELLET MILL (75) Inventor: Steven J. Walker, Jaffrey, NH (US)

(73) Assignee: New England Wood Pellet, LLC, Jaffrey, NH (US)

(*) Notice: Subject to any disclaimer, the term of this patent is extended or adjusted under 35 U.S.C. 154(b) by 521 days.

(21) Appl. No.: 13/030,297

(22) Filed: Feb. 18, 2011

(65) Prior Publication Data

US 2012/0211914 A1  Aug. 23, 2012

(51) Int. Cl.
B29C 43/58 (2006.01)
B01J 2/20 (2006.01)

(52) U.S. Cl.
CPC .......................................... B01J 2/20 (2013.01)

(58) Field of Classification Search
CPC ...................................................... B29C 43/58
USPC ......... 425/150, 363, 365, 294, 356, 367, 406, 425/331
See application file for complete search history.

(56) References Cited

U.S. PATENT DOCUMENTS

| | | |
|---|---|---|
| 3,280,426 A | 10/1966 | Meakin |
| 3,807,926 A * | 4/1974 | Morse ........................... 425/331 |
| 4,111,632 A | 9/1978 | Leaver |
| 4,226,578 A | 10/1980 | Grobli |
| 4,380,424 A | 4/1983 | Skoch |
| 4,411,612 A | 10/1983 | Holland |
| 4,413,016 A | 11/1983 | Skoch |
| 4,453,908 A | 6/1984 | Visser |
| 4,725,958 A | 2/1988 | Volk |
| 4,770,621 A | 9/1988 | Groebli |
| 4,824,352 A | 4/1989 | Hadley |
| 4,976,907 A | 12/1990 | Brotz |
| 4,983,343 A | 1/1991 | Lund |
| 5,792,485 A | 8/1998 | Korse |
| 6,099,288 A | 8/2000 | Long |
| 6,244,850 B1 | 6/2001 | Van Benthum |
| 6,299,430 B1 | 10/2001 | Wallace |
| 6,551,090 B2 | 4/2003 | Pallmann |
| 7,311,511 B2 | 12/2007 | Pallmann |
| 7,467,585 B2 | 12/2008 | Pallmann |
| 2005/0230872 A1 | 10/2005 | Scobee et al. |
| 2008/0217815 A1 | 9/2008 | Akopyan |
| 2010/0183759 A1 | 7/2010 | Allis |

* cited by examiner

Primary Examiner — Christina Johnson
Assistant Examiner — Xue Liu
(74) Attorney, Agent, or Firm — Peter A. Nieves; Sheehan Phinney Bass + Green PA (57) ABSTRACT A pellet mill is disclosed having a ring die and a powered extrusion roll with external bearings. The ring die may be powered or free rotating. Pressure and temperature at the pinch gap between the die and roll may be monitored and the mill rotation drives and the pinch gap size may be adjusted during operation. The operational parameters may be monitored and controlled by a computer based system in real time.

18 Claims, 7 Drawing Sheets

PELLET MILL

FIELD OF THE INVENTION

The present invention relates to pellet mills, and more particularly, is related to pellet mills using extrusion techniques.

BACKGROUND

Extrusion-type pellet mills and the process of producing pellet material using such devices are well known in the art. In pellet mills, a mixture of material to be pelleted, or "feed," is typically fed to a die having a plurality of extrusion holes. Pellets are generally formed when the feed is compressed and molded between a pressure roll and an extrusion die.

During the extrusion process, generally one or more extrusion rolls travels over the compression side of the die and forces the material between the die and the rolls. This movement squeezes the material through extrusion holes in the die. As the material emerges from the discharge side of the die, the extrusions are severed to produce pellets. Other parts of the pellet mill may facilitate the continuous compression of feed between the pressure rolls and the die and the handling of the extruded pellets.

Each pellet mill is generally equipped with a die and roll assembly which often includes a plurality of pressure rolls, an extrusion die, and a mechanism for delivering feed material evenly along an inner surface of the extrusion die so that the feed can be compressed by the pressure rolls when they roll over the inner surface of the die. The inner surface of the die is also known as the compression surface or the extrusion surface. It is desirable to maximize production of pellets over a period of time. However, the need for frequent roll maintenance may limit pellet production efficiency.

Figure 1A:
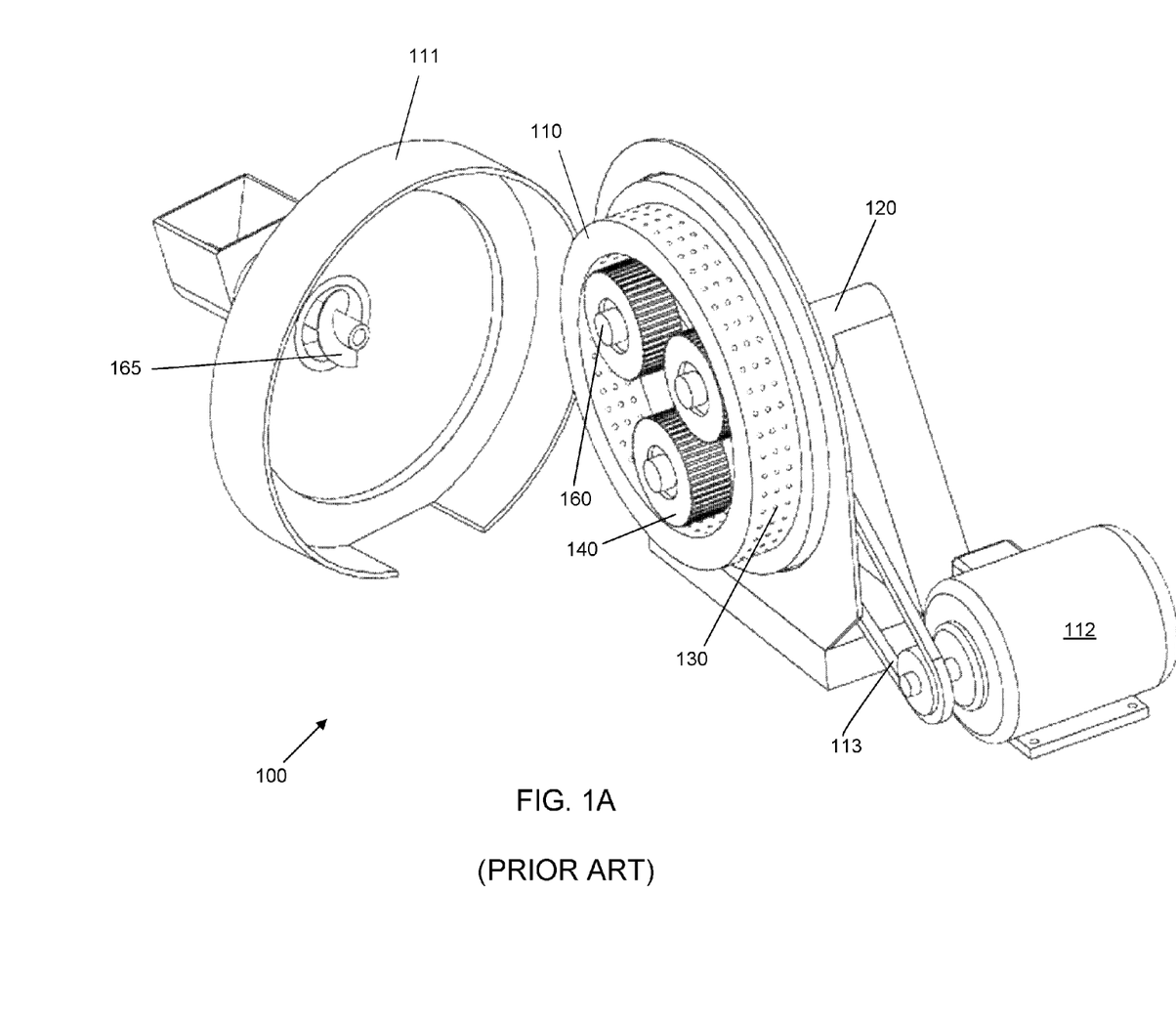
FIG. 1A is a schematic drawing depicting a prior art pellet mill with a ring die and passive rolls with the die housing open for clarity.

FIG. 1A is a simplified diagram of a prior art pellet mill 100. The pellet mill 100 in FIG. 1 is an example of a common pellet extrusion mill. A die cover 111 is shown in an open position displaying a ring die 110 that is mounted upon a main shaft 120. The ring die 110 rotates around the main shaft 120. The ring die 110 may be powered, for example, by affixing the ring die 110 to the main shaft 120 and driving the main shaft 120 so the ring die 110 rotates in rigid rotation with the main shaft 120. Alternatively, the main shaft 120 may be fixed, and the ring die 110 may be driven by an external motor 112 via, for example, a belt 113, or an external friction roller (not shown) in contact with the exterior of the ring die 110. The inner and outer surfaces of the ring die 110 contain a plurality of extrusion holes 130. The feed material is fed into the ring die 110 by, for example, an auger 165, and forced into the extrusion holes 130 on the interior surface of the ring die 110, and emerges from the extrusion holes 130 on the exterior portion of the ring die 110. The extruded material may then be cut, for example, with a blade (not shown) to form pellets.

Figure 1B:
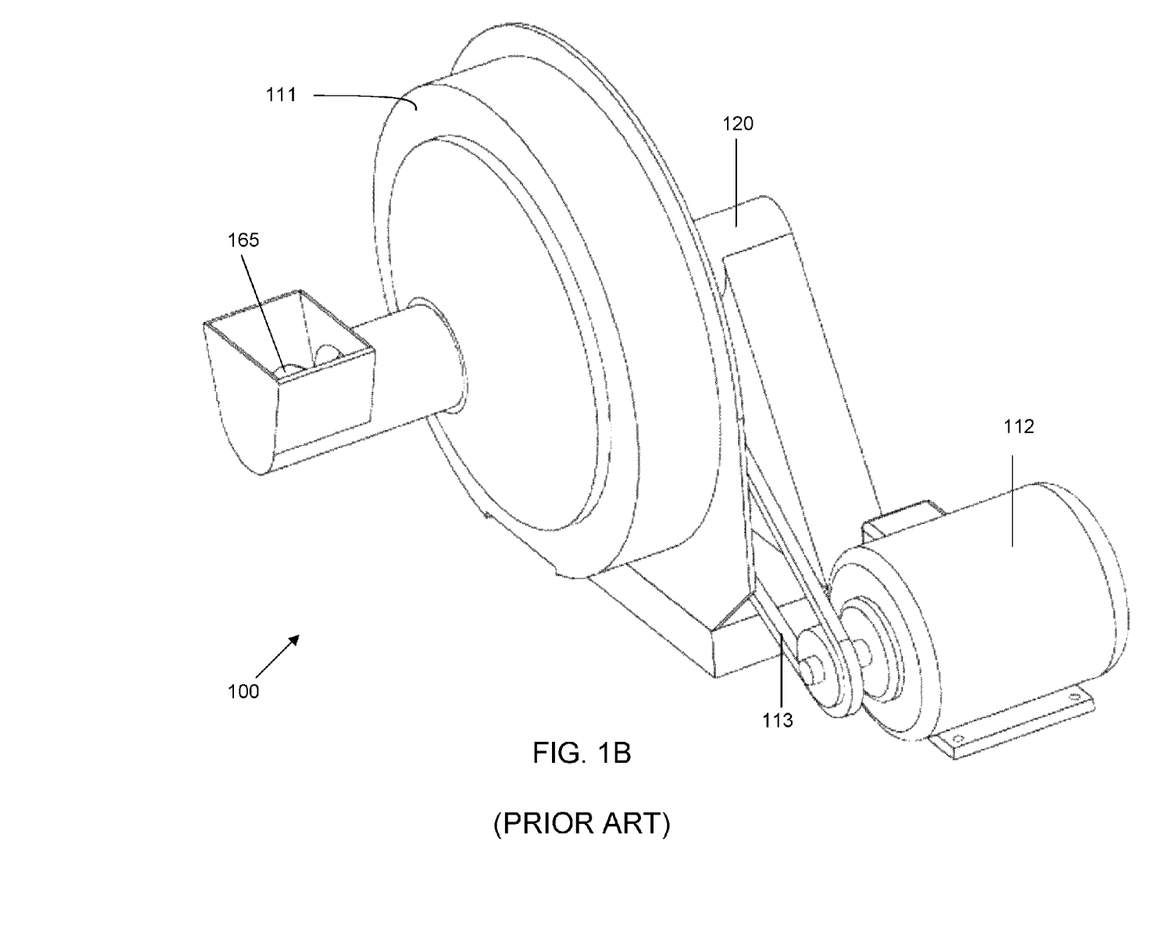
FIG. 1B is a schematic drawing depicting the prior art pellet mill with the die housing closed.
Figure 2:
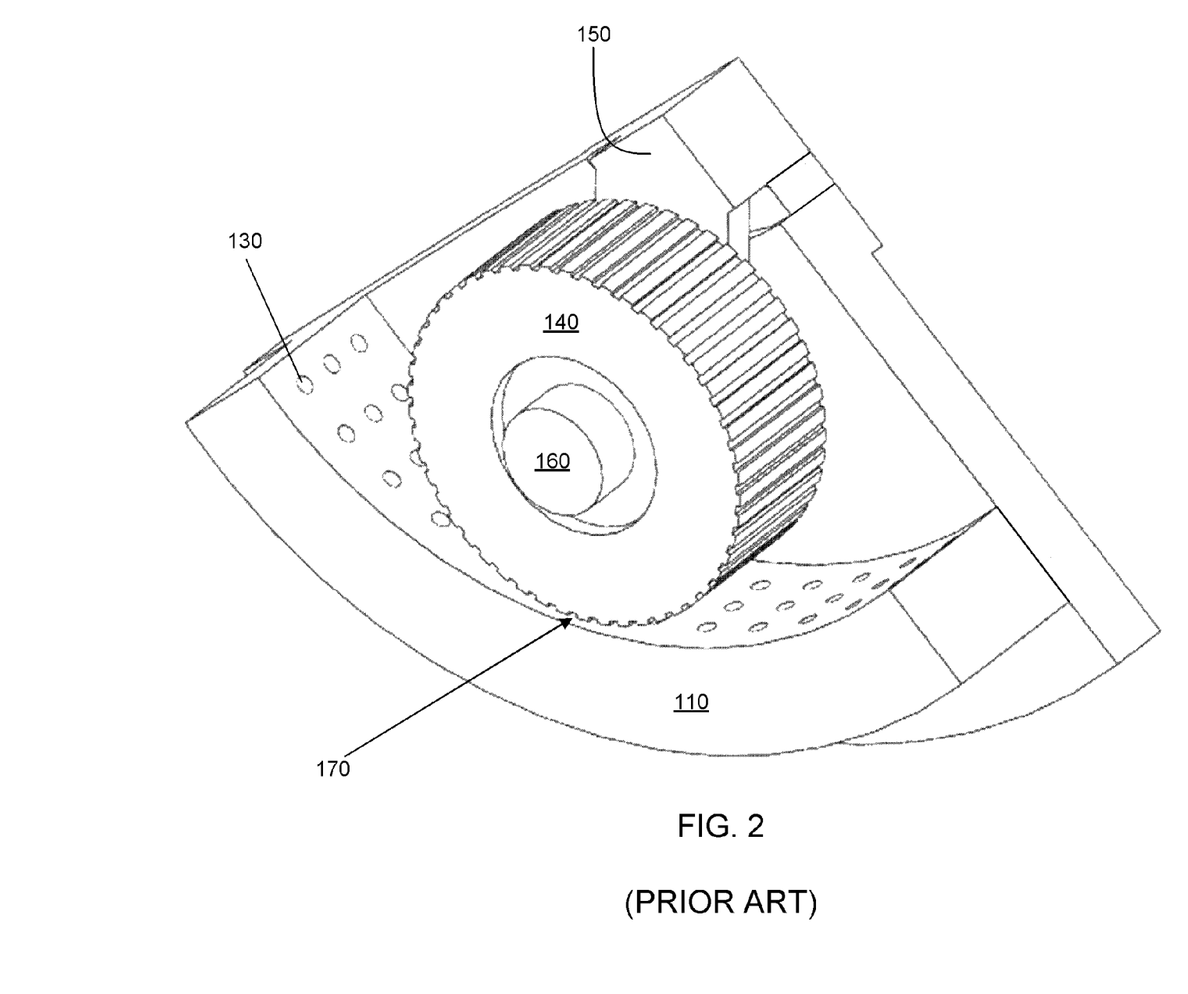
FIG. 2 is a schematic drawing of a detail of the pinch gap of the prior art pellet mill.

The feed in the pellet mill 100 is forced through the extrusion holes 130 by multiple rolls 140. Note that while three rolls 140 are depicted in FIG. 1A, prior art pellet mills may have one, two, three, four, or more rolls. Each roll 140 is freely rotating around a roll shaft 160, and each roll 140 is mounted on a carriage 150 (FIG. 2). The carriage 150 (FIG. 2) may be stationary, or may be driven to rotate around the main shaft 120. When feed is introduced to the interior of the ring die 110 by a feed path, for example, by the auger 165, attached to the die cover 111, the feed is driven toward the rolls 140. Note that in FIG. 1A the auger 165 is shown as separated from the rolls 140, for the purpose of clarity. When the die cover 111 is closed over the ring die 110, as shown in FIG. 1B, the auger 165 is positioned in the center of the die 110 so that the auger 165 may distribute feed material to the rolls 140.

In general, the rolls 140 do not come into direct contact with the inner surface of the ring die 110. Each roll 140 is separated from the ring die 110 by a pinch gap 170, as shown in FIG. 2. In order to provide optimum performance, it is desirable to monitor the size of the pinch gap 170 between the roll 140 and the die 110, and further to adjust the pinch gap 170 size as needed. For example, there may be variations in consistency of the feed over time, requiring either more or less pinch gap 170 pressure between the roll 140 and die 110 for optimum performance, and to compensate for wear on the roll 140 and die 110. However, since the rolls 140 are free rotating within the ring die 110, generally pinch gap 170 size, pressure and temperature are not monitored. Further, in multiroll extrusion ring dies, the gap size must generally be adjusted on a per-roll basis, for example, by adjusting where the roll 140 is located upon the interior roll carriage 150. Such adjustments have heretofore required opening the ring die enclosure 111 (FIG. 1A) to access the rolls 140 and roll carriage 150. Therefore, the pinch gap 170 size in prior art ring dies 110 is generally static, such that it cannot be adjusted during normal operation, or in response to real time conditions.

The roll assemblies operate in a harsh environment. The rolls must be sealed to prevent the feed from entering the roll mechanisms, and to prevent lubricants or coolants from excessively leaking from the roll assemblies into the feed material. Since the rolls are generally located within a partially sealed die, they are generally difficult to access for maintenance and repair. The rolls are constantly subjected to high pressure in order to force the feed through the extrusion holes, and this pressure generates friction, heating the rolls and die as they rotate.

Since most rolls within a die extrusion ring are passive, they rely on the friction of the feed between the roll and the die to rotate the rolls. In some instances, particularly upon startup, the rolls may slip instead of rotating, causing vibration through the pellet mill and possibly causing additional wear to the components. However, since the rolls are typically mounted within the sealed extrusion die, it has heretofore been impractical to employ powered rolls, due to the difficulties of both driving the rolls and maintaining adequate pressure between the rolls and the die ring to force the feed through the extrusion holes. Some previous systems have mounted multiple rolls on a carriage within the extrusion die, and power the carriage so that the carriage rotates within the die, rotating the rolls around the interior surface of the die. However, in such systems the rolls themselves are still free rotating, and may therefore still experience slippage.

Roll bearings bear the pressure used to force the feed through the extrusion holes, and thus experience heat and stress, limiting lifespan of the roll. In general, larger bearings hold up better under higher pressure. Since the bearings have heretofore been located within physical confines of the roll itself, the maximum size of the bearing has been limited by the physical size of the roll. While it was possible to increase the size of the roll to facilitate larger bearings, the larger roll would be subjected to proportionally greater pressure, therefore generally negating the advantage sought from larger bearings. In order to facilitate the larger bearings, the size of the roller infrastructure has typically been reduced. This interdependency has necessitated a tradeoff between roller structural stability and bearing size.

The roll bearings typically require significant maintenance. Since the bearings are generally located within the rolls, which, in turn, are located within the ring die, servicing the roll bearings requires opening the die housing to access the rolls. This may lead to significant down time in the pellet manufacturing process. Furthermore, the complexity of rolls with integrated internal bearings may complicate the procedure for replacing and repairing the rolls. As a result, roll and bearing maintenance is time consuming, expensive, and causes an interruption of pellet production. In addition, frequent servicing of the rolls may increase safety risks to maintenance personnel, due to the high heat and pressure related with the die and rolls.

Therefore, there is an unmet need for an extrusion ring die having improved cooling and lubrication characteristics, that may be serviced less frequently than previous pellet mills, and that may be serviced without generally requiring frequent access to the interior region of the ring die. Further, there is a need for monitoring the pinch gap distance between the roll and die, as well as the pressure on the feed and the temperature of the roll, and to adjust the pinch gap size during system operation.

SUMMARY

Embodiments of the present invention provide a pellet mill with a powered roll. Accordingly, a first aspect of the present invention is directed to a pellet mill having a main shaft housing including a main shaft bearing, a main shaft rotatably mounted through the main shaft bearing, and a ring die attached to the main shaft, the ring die rotating in rigid accompaniment with the main shaft. The pellet mill also includes a roll shaft housing external to the ring die, the roll shaft housing including a roll shaft bearing. The pellet mill further includes a roll disposed within the ring die, and a roll shaft. The roll shaft has a proximal end and a distal end. The roll shaft distal end is attached to the roll, and the roll rotates in rigid accompaniment with the roll shaft. The roll shaft proximal end is rotatably mounted through the roll shaft bearing.

A second aspect of the present invention is directed to a pellet mill including a main shaft housing having a first elevation, where the main shaft housing has a main shaft bearing, where a main shaft is rotatably mounted through the main shaft bearing. The pellet mill further includes a ring die attached to the main shaft, where the ring die rotates in rigid accompaniment with the main shaft. The pellet mill has a roll shaft housing external to the ring die, where the roll shaft housing has a second elevation includes a roll shaft bearing. A roll shaft with a proximal end and a distal end has the proximal end rotatably mounted through the roll shaft bearing, and has a roll attached to the distal end. The roll rotates in rigid accompaniment with the roll shaft, and the roll is disposed within the ring die. An elevator is configured to alter the first elevation relative to the second elevation.

Briefly describe, in architecture, a third aspect of the present invention is directed to a pellet mill system having a ring die with an inner surface, and a roll with an outer surface, where the roll is disposed within the ring die. The region at the closest point between the ring die inner surface and the roll outer surface bounds a pinch gap where a pinch gap size is the shortest distance between the ring die inner surface and the roll outer surface. The pellet mill system further includes a pinch gap size adjustment means and a pinch gap size adjustment means controller.

A fourth aspect of the present invention is directed to a pellet mill system having a ring die with a ring die inner surface, a roll with a roll outer surface, the roll disposed within the ring die, and a pinch gap including the region at the closest point between the ring die inner surface and the roll outer surface. The pellet mill system also includes a roll drive configured to rotate the roll, and a roll drive controller configured to control the roll drive.

A fifth aspect of the present invention is directed to a method for controlling a pellet mill having a powered ring die, a powered internal roll and a pinch gap between the ring die and the internal roll. The method includes the steps of detecting pressure upon the roll, and adjusting the size of the pinch gap while the pellet mill is operating, based at least in part upon the detected pressure upon the roll.

A sixth aspect according to the present invention is directed to computer readable media for a pellet mill having a ring die, a ring die drive configured to rotate the ring die, a ring die drive controller configured to control the ring die drive, a roll disposed substantially within the ring die, the roll separated from the ring die by a distance defining a pinch gap, a pinch gap size controller, a roll temperature sensor, a roll pressure sensor, a roll drive configured to rotate the roll, and a roll drive controller configured to control the roll drive. The computer readable media includes instructions configured to perform the steps of reading a roll pressure value detected by the roll pressure sensor, and adjusting the pinch gap size with the pinch gap size controller based in part upon the roll pressure value.

Other systems, methods and features of the present invention will be or become apparent to one having ordinary skill in the art upon the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

A pellet mill is provided having a ring die and a powered extrusion roll with roll bearings external to the ring die and the roll bearings external to the roll. The ring die may be powered or free rotating. Parameters associated with the pinch gap between the die and roll may be monitored. The die drive, if any, the roll drive, and the pinch gap size may be adjusted during operation. The operational parameters may be monitored by a computer based system that may then adjust system controllers in real time.

First Embodiment

Figure 3A:
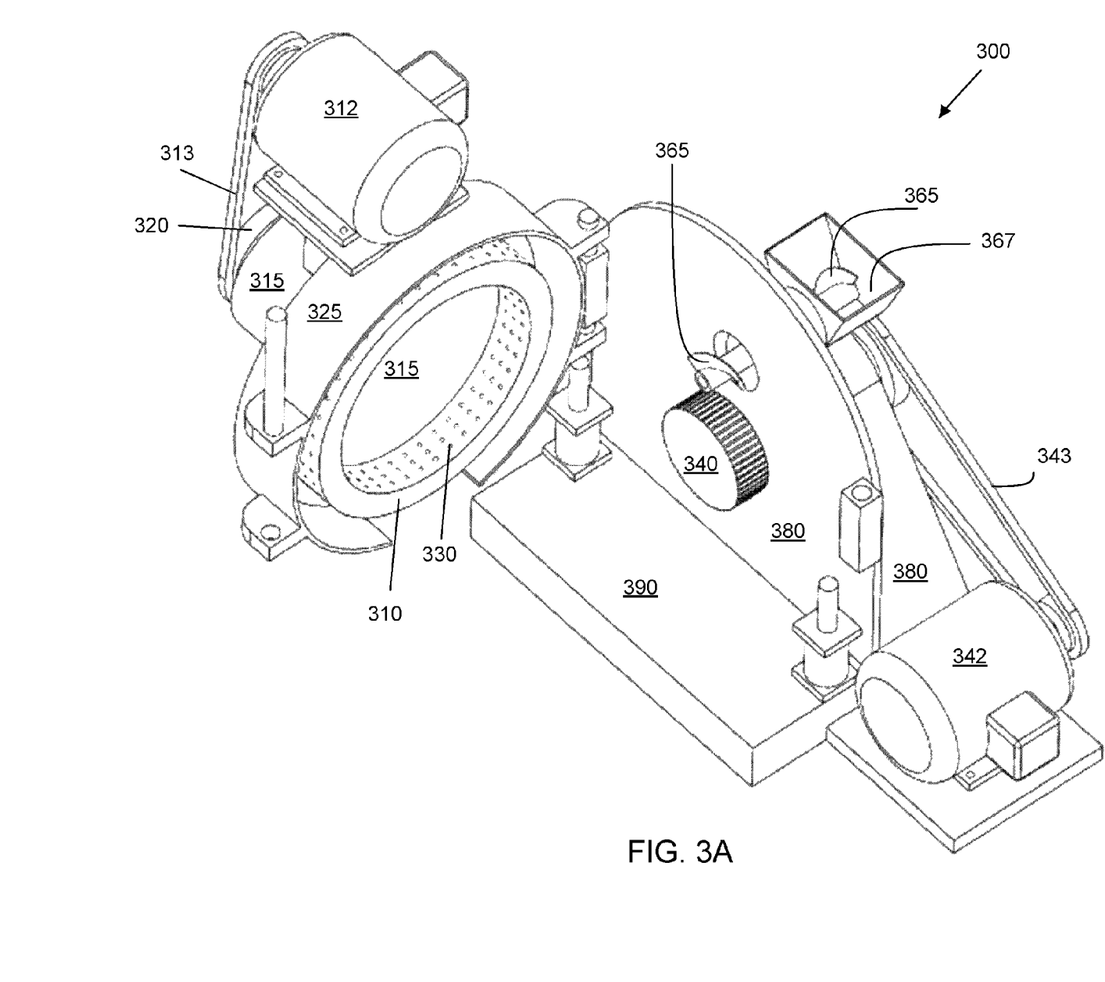
FIG. 3A is a schematic drawing of a first embodiment of the pellet mill of the current invention showing the ring die rotated away from the roll.
Figure 3B:
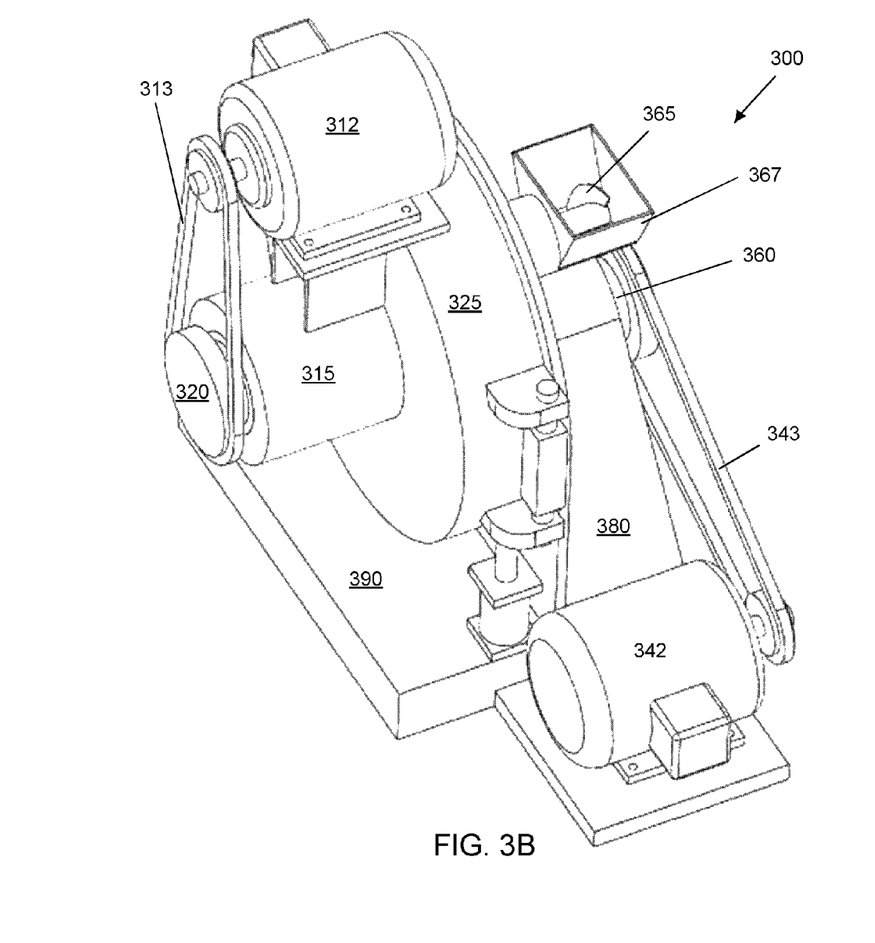
FIG. 3B is a schematic drawing of a first embodiment of the pellet mill of the current invention in operational position.

FIGS. 3A and 3B are schematic diagrams of a first embodiment of a pellet mill 300 with an externally powered roll 340. FIG. 3B shows the pellet mill 300 in operational position. FIG. 3A shows the pellet mill 300 with the ring die 310 rotated away from the powered roll 340. While FIG. 3A shows the pellet mill in a non-operational position, it should be noted that this view represents the vantage point of a person performing maintenance on the pellet mill 300. A ring die 310 having a ring die housing 315 rotates around a main shaft 320. The ring die 310 has an inner extrusion surface with a plurality of extrusion holes 330 that pass from the inner extrusion surface to a ring die outer surface. It should be noted that there are many variations on extrusion holes within the scope of this disclosure that are familiar to persons having ordinary skill in the art. Extrusion holes 330 may have, for example, countersunk inlets or outlets, may be of consistent diameter, or may have a diameter that tapers, as required for a particular milling application.

Figure 4:
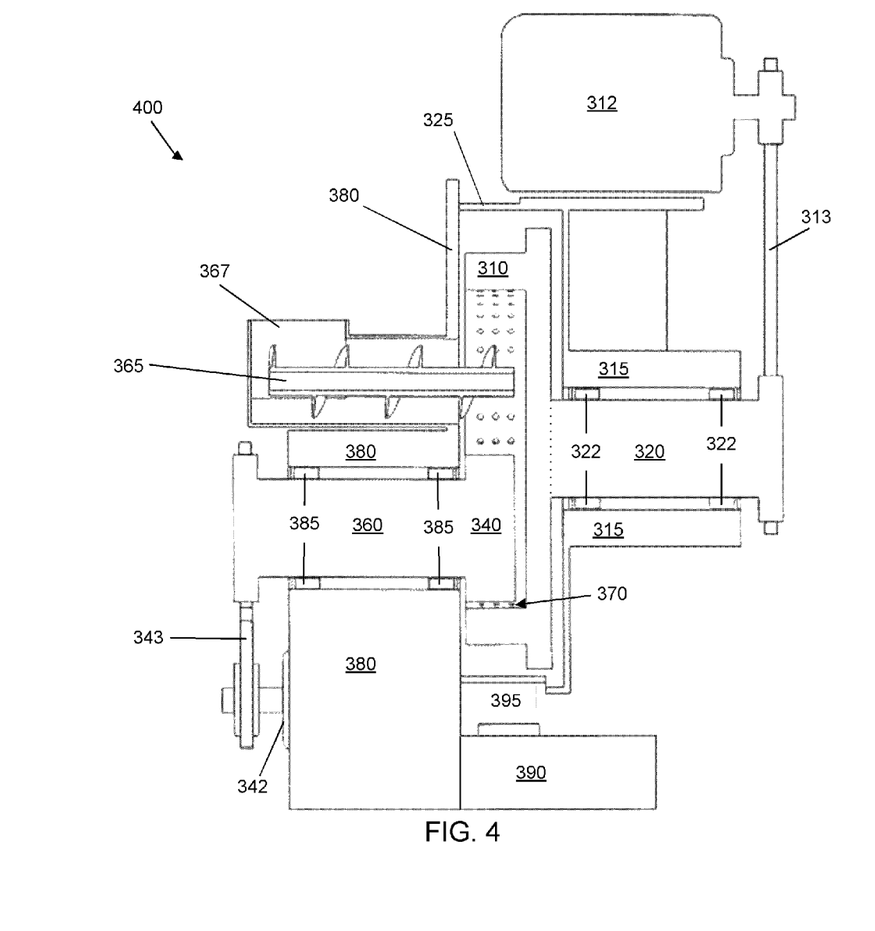
FIG. 4 is a cross sectioned view of a second embodiment of the pellet mill of the current invention.

The main shaft 320 is supported by a ring die cover 325, and the ring die cover 325 in turn rests upon a ring die platform 390. The powered roll 340 rotates in rigid accompaniment with a cantilevered roll shaft 360 (FIG. 3B). The roll 340 operates within the ring die 310 and draws feed propelled to the ring die 310 by auger 365 to a pinch gap 370 (FIG. 4) between the roll 340 and the ring die 310, forcing the feed through the extrusion holes 330. The roll shaft 360 (FIG. 3B) is mounted in a roll shaft housing 380. The roll shaft housing 380 is located substantially alongside the ring platform 390. Note that there is no objection to the ring die platform 390 and the roll shaft housing 380 being integrated into a single contiguous unit. The roll shaft housing 380 contains roll shaft bearings 385 (FIG. 4). Additionally, the size of the roll shaft housing 380 may be adjusted to accommodate larger roll shaft bearings 385 (FIG. 4). Note that while FIG. 4 shows two roll shaft bearings 385, there is no objection to using three or more roll shaft bearings 385.

Since the roll shaft bearings 385 are not housed within the confines of the roll 340 itself, roll bearings in the first embodiment of the pellet mill 300 are not constrained to sizes that would fit within the roll 340. For example, the roll shaft bearings may be larger than the roll 340. Larger roll shaft bearings may be advantageous, for example, to better dissipate heat due to friction of the roll shaft 360 (FIG. 3B) rotating under pressure caused by the roll 340 forcing feed into the pinch gap 370 (FIG. 4) between the roll 340 and the ring die 310.

The roll shaft bearings 385 (FIG. 4) may be lubricated to reduce friction. The lubrication of the roll shaft 360 (FIG. 3B) may be, for example, a solid lubricant, grease, or a re-circulating fluid lubricant, such as oil. In particular, re-circulating fluid lubricant may also serve to cool the roll bearings 385 (FIG. 4) by conveying heated lubricant from the roll bearings 385 (FIG. 4) where it is replaced by cooler re-circulating fluid lubricant from a lubricant reservoir. Alternatively, the roll bearings 385 (FIG. 4) may be cooled by other means, such as convection cooling, or by a liquid coolant distinct from a lubricant. Under the first embodiment, the roll bearings 385 (FIG. 4) and main shaft bearings 322 (FIG. 4) are external to the ring die cover 325, thereby significantly reducing the possibility of lubricant or coolant from the bearings 385, 322 (FIG. 4) entering the ring die 310, and therefore, from entering the pellets produced from the ring die 310.

With the roll bearings 385 (FIG. 4) in the first embodiment not restricted within the confines of the roll 340, bearing sizes, configurations, and implementations may be more flexible and varied than with rolls 340 having internal bearings. Therefore a person having ordinary skill in the art may select roll bearings 385 (FIG. 4) that will require less frequent maintenance in comparison to internal bearings. For example, roll bearings 385 (FIG. 4) may be selected that will withstand greater pressures than is possible with internal bearings. Further, since the roll 340 does not contain bearings, the design of roll 340 may be more robust, minimizing roll maintenance. In addition, the first embodiment may employ roll 340 sizes that may have otherwise been considered too large or too small to be practical for rolls with internal bearings.

The ring die 310 may rotate with the main shaft 320 under power, for example by a ring die motor 312. In an alternative embodiment (not shown), the ring die 310 may be free rotating, and the ring die 310 rotate as a result of feed material being pressed against it by the powered roll 340.

When the pellet mill 300 is operating, the ring die cover 325 holds the ring die 310 close against the roll shaft housing 380, containing the feed within the ring die 310 and the ring die housing 315. Note that there is no objection to additional means for sealing the ring die 310 against the roll shaft housing 380, for example, gaskets, or a lip on the roll shaft housing 380 or an inset region in the roll shaft housing 380 formed to receive the edge of the ring die 310. Feed is introduced to the interior of the ring die 310 via a feed path.

The feed path in the first embodiment includes a hopper 367, leading to an auger 365. The auger passes through an opening in the roll shaft housing 380, so that the auger may deposit feed materials into the interior of the ring die 310. Of course, other feed paths and mechanisms may be used to introduce feed to the interior of the ring die 310, as would be understood by persons having ordinary skill in the art. Note that in alternative embodiments (not shown), the ring die housing may close against a cover plate (not shown) that is not integral with the roll shaft housing 380, where the feed path and the roll 340 pass through apertures in the cover plate.

Second Embodiment

Returning to FIG. 1A, as noted above, in prior art pellet mills 100 it is difficult to change the size of the pinch gap 170 (FIG. 2). Prior art pellet mills 100 generally require the pellet mill 100 to be stopped and the ring die 110 opened to adjust the pinch gap 170 (FIG. 2) size. Similarly, since the rolls 140 are generally sealed within the ring die 110, it is generally infeasible to monitor the pressure and temperature between the internally mounted rolls 140 and the ring die 110. Under a second embodiment of the pellet mill, as shown in FIG. 4, the pinch gap 370 may be continuously monitored and adjusted.

A cross-sectioned view of the second embodiment of a pellet mill 400 is shown in FIG. 4. Like the first embodiment of the pellet mill 300 (FIG. 3A), a roll 340 is powered with a roll shaft 360 having bearings within a roll shaft housing 380. The roll 340 operates within a ring die 310. The ring die 310 rotates in rigid conformity with a main shaft 320, and the ring die 310 may rotate under power, for example, by a motor 312 and a belt 313, or may rotate freely. The ring die 310 and the main shaft 320 are supported by a ring die cover 325. The ring die platform 390 in the second embodiment may be separate from the roll shaft housing 380. The ring die cover 325 rests indirectly upon a ring die platform 390. The elevation of the ring die cover 325, and hence, the elevation of the ring die 310, may be adjusted with an elevator 395 located between the ring die cover 325 and the ring die platform 390. The elevator 395 may be used to adjust the size of the pinch gap 370 between the roll 340 and the inner extrusion surface of the ring die 310. For example, by raising the ring die cover 325 with the elevator 395, the size of the pinch gap 370 is decreased, as the relative elevation of the ring die 310 becomes higher in relation to the roll 340. Inversely, by lowering the ring die cover 325 with the elevator 395, the size of the pinch gap 370 is increased.

While FIG. 4 shows the second embodiment with the roll shaft housing 380 being stationary and the ring die cover 325 having a variable elevation, there is no objection to, for example, a stationary ring die cover 325 and a variable elevation roll shaft housing 380, or having adjustable elevation for both the ring die cover 325 and the roll shaft housing 380.

The ring die elevator 395 may be implemented in different ways consistent with this disclosure familiar to a person having ordinary skill in the art. For example, the ring die cover 325 may rest on a surface that is raised or lowered using a rotary geared mechanism, or supported by cables controlled by a winch. In the second embodiment as pictured in FIG. 4, the ring die cover 325 rests upon the ring die elevator 395 that uses a hydraulic piston, which may be controlled by electronic or mechanical means.

A sensor (not shown) in the elevator 395 in the second embodiment may be used to monitor the pressure at the pinch gap 370. The elevator 395 may utilize sensors that can detect the amount of force being exerted upon it. For example, in an embodiment, such as the second embodiment, where the elevator 395 is a hydraulic piston, the pressure of the hydraulic fluid may be monitored. This pressure may be used to determine the pressure on the feed in the pinch gap 370 between the roll 340 and the ring die 310. Therefore, the pressure in the pinch gap 370 may be monitored and adjusted by changing the size of the pinch gap 370 if the detected pressure is either above or below a desired range of desirable pressure. Similarly, the size of the pinch gap 370 may be monitored by an encoder for distance, or by other means. As described further below, this pressure monitoring may be used to actively adjust the pinch gap 370 size, for example, under computer control.

Under normal operation of the pellet mill 400, a base pad of partially crushed feed typically builds up around the inner surface of the ring die 310. There is initially no pad when the pellet mill 400 is first started, before feed is introduced into the pinch gap 370. Therefore, the pinch gap 370 is preferably open to prevent the roll 340 from grinding directly against the ring die 310. Under the second embodiment the pinch gap 370 may be actively monitored and adjusted, particularly during the start up time, in contrast to the prior art rolls 140 (FIG. 2) that tended to grind and slip with the fixed pinch gap 170 (FIG. 2) size of earlier systems until equilibrium was reached. Avoiding this initial "thrashing" period through active adjustment of the pinch gap 370 and adjustment of power to the roll 340, for example, by adjusting the rate of the roll motor 342, may reduce wear on both the roll 340 and the die 310. An electronic or computer controlled feedback system where the pinch gap 370 is actively adjusted based upon sensed pressure, temperature, and/or power of the roll 340 may allow the system to further minimize wear or damage from, for example, occasional variation in feed density or consistency. Such an electronic monitoring system is further described below.

In addition to an active pinch gap monitoring system, or in lieu of one, the elevator 395 may serve as either an active or passive suspension system for the roll 340 and ring die 310. For example, an embodiment of the elevator 395 that includes a hydraulic piston may be tuned so that the piston oscillates slightly in response to a sudden change in pressure at the pinch gap 370, rather than actively adjusting the gap size in response to a sudden pressure change. A combination of suspension and active gap monitoring and control is possible within the scope of this disclosure.

Temperature Monitoring

In addition to the pressure sensing elements mentioned above, under the pellet mill first and second embodiments the roll 340 may also include a temperature sensor. This sensor may be a thermometer, a thermistor, a thermocouple, or another similar temperature sensing device. The temperature sensor may be integral to the roll 340 structure, with temperature information communicated from the sensor through the roll shaft 360 to a temperature monitor (not shown). Similarly, the temperature sensor may be incorporated into the roll shaft 360, or set between the roll 340 and the roll shaft 360. The temperature of the roll 340 may be taken into consideration when setting, for example, the roll motor 342 speed, the feed rate of the auger 365, and the pinch gap 370 size. For example, a high temperature reading may indicate that it would be appropriate to either increase the pinch gap 370 size or to decrease the roll motor 342 speed.

Temperature and pressure monitoring of the roll 340 may also be used to adjust additional elements of a pellet mill familiar to those having ordinary skill in the art. For example, the roll pressure and/or temperature may be taken into account in adjusting the moisture content of the feed, the level or type of additives mixed with the feed, or the appropriate preheating temperature for the feed.

Drive Control

As mentioned previously, under both the first and second pellet mill embodiments the roll 340 may be powered, so that the rotation of the roll 340 is driven by a drive element, such as the roll motor 342. The roll motor 342 may be a direct drive, in that the roll motor 342 directly rotates the roll shaft 360, or the roll motor 342 may drive the roll shaft 360 indirectly, for example, with a roll belt 313, or gears, or other mechanisms. The ring die 310 may be similarly driven, for example by a ring die motor 312, or may be free rotating. The control of the drive speed for the roll 340, the ring 310, or both, may be controlled in part as a result of monitoring system parameters, including pinch gap 370 pressure and temperature. In addition, in an embodiment where the ring die 310 is powered, the ratio of power between the roll motor 342 and the ring die motor 312 may also be controlled. It is also possible to adjust the drive power ratio between the ring die motor 312 and the roll motor 342 depending upon other factors, such as the density and consistency of the feed. In such embodiments where the ring die 310 is driven, the roll 340 may be free rotating, or the roll 340 may have a roll motor 342 that may be disengaged so that the roll may rotate freely as desired.

System

Figure 5:
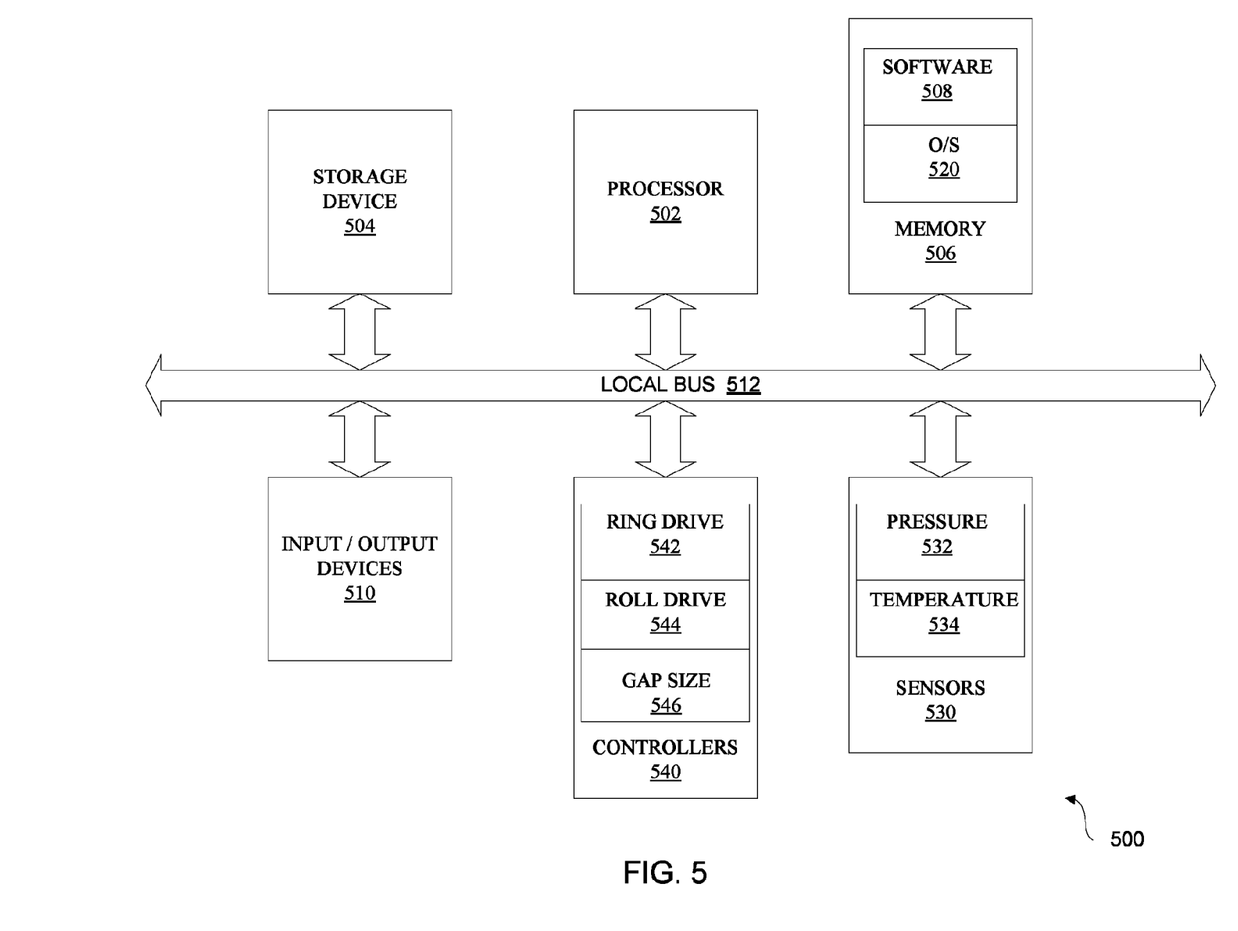
FIG. 5 is a schematic diagram illustrating an example of a system for executing functionality of the present invention.

As previously mentioned, a system for executing the roll drive control and/or ring die drive control and feed path rate under the pellet mill first and second embodiments, as well as for controlling pinch gap 370 monitoring and adjustment functionality under the second embodiment, may be a computer. FIG. 5 is a functional block diagram of a control system 500 under the first and second pellet mill embodiments. The system 500 contains a processor 502, a storage device 504, a memory 506 having software 508 stored therein that defines the abovementioned functionality, input and output (I/O)

devices 510 (or peripherals), sensors 530, controllers 540, and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above. The system 500 may be utilized to monitor several parameters during the operation of pellet mill 400 (FIG. 4), including pressure via a pressure sensor 532 and temperature via a temperature sensor 534. The values of these parameters may be used to adjust operating parameters of several controllers, including, but not limited to, a ring drive controller 542, a roll drive controller 544, and a gap size controller 546 under the control of the processor 520. As mentioned above, the ring drive controller 542 and the roll drive controller 544 may be motors, and the gap size controller may be the controller for the elevator 395 (FIG. 4).

In summary, a pellet mill having an active extrusion roll with external bearings has been disclosed. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pellet mill comprising:
a ring die housing comprising a main shaft bearing affixed to the ring die housing;
a main shaft rotatably mounted to the ring die housing through the main shaft bearing and disposed substantially within the ring die housing;
a ring die attached to the main shaft, the ring die rotating in rigid accompaniment with the main shaft;
a roll shaft housing external to the ring die, the roll shaft housing comprising a roll shaft bearing;
a roll disposed within the ring die; and
a roll shaft comprising a proximal end and a distal end, wherein the distal end is attached to the roll, the roll rotating in rigid accompaniment with the roll shaft, and the roll shaft proximal end rotatably mounted through the roll shaft bearing.

2. The pellet mill of claim 1, further comprising a roll drive configured to rotate the roll shaft.

3. The pellet mill of claim 2, wherein the roll drive is selected from a group consisting of a belt drive motor, a direct drive motor, and a gear drive motor.

4. The pellet mill of claim 1, further comprising a ring die drive configured to rotate the ring die.

5. A pellet mill comprising:
a ring die housing having a first elevation, the ring die housing comprising a main shaft bearing affixed to the ring die housing;
a main shaft rotatably mounted to the ring die housing through the main shaft bearing and disposed substantially within the ring die housing;
a ring die attached to the main shaft, the ring die rotating in rigid accompaniment with the main shaft;
a roll shaft housing external to the ring die, the roll shaft housing having a second elevation, the roll shaft housing comprising a roll shaft bearing;
a roll shaft comprising a proximal end and a distal end, the roll shaft proximal end rotatably mounted through the roll shaft bearing;
a roll attached to the roll shaft distal end, the roll rotating in rigid accompaniment with the roll shaft, the roll being disposed within the ring die; and
an elevator configured to alter the first elevation relative to the second elevation.

6. The pellet mill of claim 5, wherein the elevator comprises a hydraulic lift.

7. The pellet mill of claim 5, wherein the first elevation is fixed and the elevator adjusts the second elevation.

8. The pellet mill of claim 5, wherein the second elevation is fixed and the elevator adjusts the first elevation.

9. The pellet mill of claim 6, wherein the elevator further comprises a hydraulic suspension.

10. The pellet mill of claim 5, wherein the roll further comprises a temperature sensor.

11. The pellet mill of claim 5, wherein the elevator comprises a pressure sensor.

12. A pellet mill system comprising:
A ring die housing comprising a main shaft bearing affixed to the ring die housing;
A main shaft rotatably connected to the ring die housing through the main shaft bearing and disposed substantially within the ring die housing;
A ring die comprising a ring die inner surface, the ring die attached to the main shaft, the ring die rotating in rigid accompaniment with the main shaft;
A roll shaft housing external to the ring die, the roll shaft housing comprising a roll shaft bearing;
A roll comprising a roll outer surface, the roll disposed within the ring die;
A roll shaft comprising a proximal end and a distal end, wherein the distal end is attached to the roll, the roll rotating in rigid accompaniment with the roll shaft, and the roll shaft proximal end rotatably mounted through the roll shaft bearing;
A pinch gap comprising the region at the closest point between the ring die inner surface and the roll outer surface;
A pinch gap size comprising the shortest distance between the ring die inner surface and the roll outer surface;
A pinch gap size adjustment means; and
A pinch gap size adjustment means controller.

13. The pellet mill system of claim 12, further comprising a temperature sensor configured to detect temperature in the pinch gap and configured to communicate temperature data to the pinch gap size adjustment means controller, wherein the pinch gap adjustment means controller is configured to adjust the pinch gap size based at least in part upon temperature data from the temperature sensor.

14. The pellet mill system of claim 12, further comprising a pressure sensor configured to detect pressure in the pinch gap and configured to communicate pressure data to the pinch gap size adjustment means controller, wherein the pinch gap adjustment means controller is configured to adjust the pinch gap size based at least in part upon pressure data from the pressure sensor.

15. A pellet mill system comprising:
A ring die housing comprising a main shaft bearing affixed to the ring die housing;
A main shaft rotatably connected to the ring die housing through the main shaft bearing and disposed substantially within the ring die housing;
A ring die comprising a ring die inner surface, the ring die attached to the main shaft, the ring die rotating in rigid accompaniment with the main shaft;
A roll shaft housing external to the ring die, the roll shaft housing comprising a roll shaft bearing;
A roll comprising a roll outer surface, the roll disposed within the ring die;
A roll shaft comprising a proximal end and a distal end, wherein the distal end is attached to the roll, the roll rotating in rigid accompaniment with the roll shaft, and the roll shaft proximal end rotatably mounted through the roll shaft bearing;
A pinch gap comprising the region at the closest point between the ring die inner surface and the roll outer surface;
A roll drive configured to rotate the roll; and
A roll drive controller configured to control the roll drive.

16. The pellet mill system of claim 15, further comprising a temperature sensor configured to detect temperature in the pinch gap and configured to communicate temperature data to the roll drive controller, wherein the roll drive controller is configured to control the roll drive based at least in part upon temperature data from the temperature sensor.

17. The pellet mill system of claim 15, further comprising a pressure sensor configured to detect pressure in the pinch gap and configured to communicate pressure data to the roll drive controller, wherein the roll drive controller is configured to control the roll drive based at least in part upon pressure data from the pressure sensor.

18. The pellet mill system of claim 15, further comprising:
a pinch gap size controller configured to adjust the size of the pinch gap; and
a pinch gap size sensor configured to detect the size of the pinch gap and configured to communicate pinch gap size data to the pinch gap size controller, wherein the pinch gap size controller is configured to control the pinch gap size based at least in part upon pinch gap size data from the pinch gap size sensor.

* * * * *